(No Model.) 4 Sheets—Sheet 1.

W. J. MUNCASTER.
LATHE FOR TURNING SHAFTING.

No. 334,538. Patented Jan. 19, 1886.

Witnesses:
Inventor

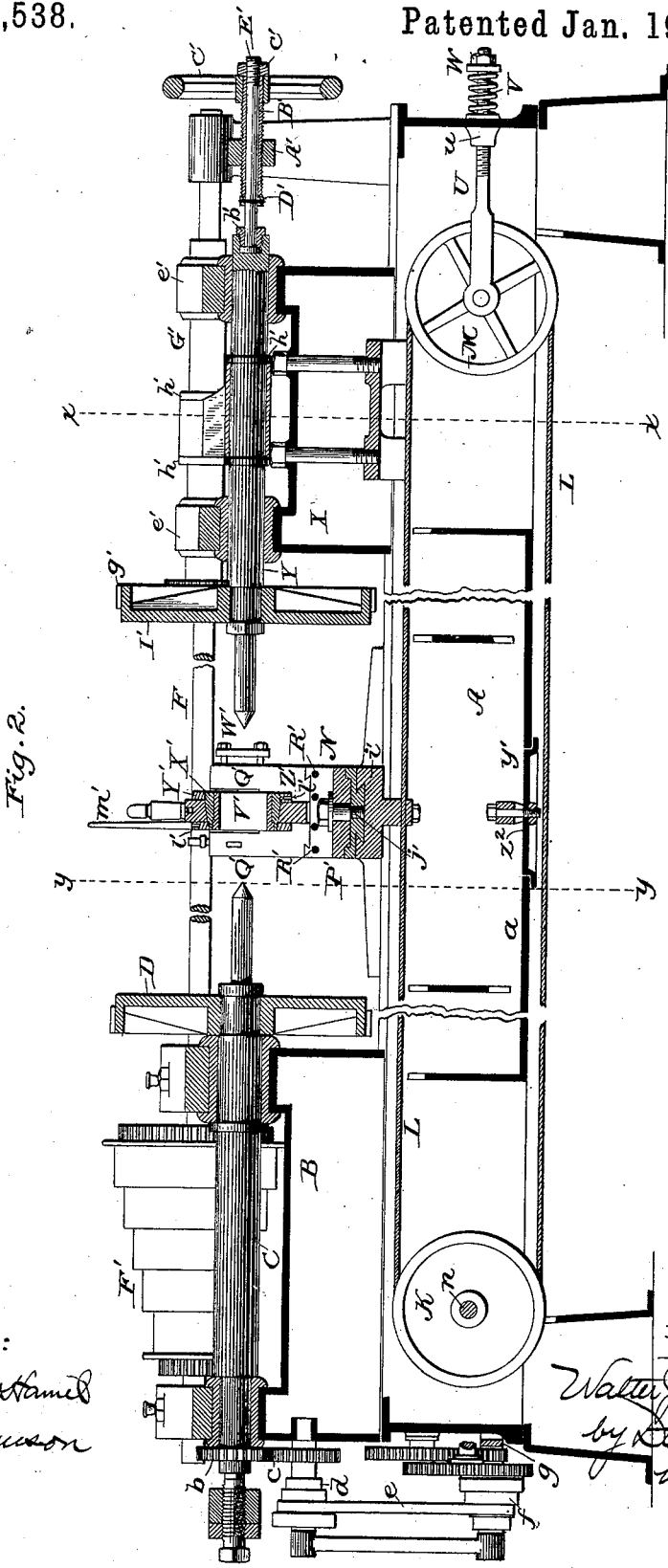

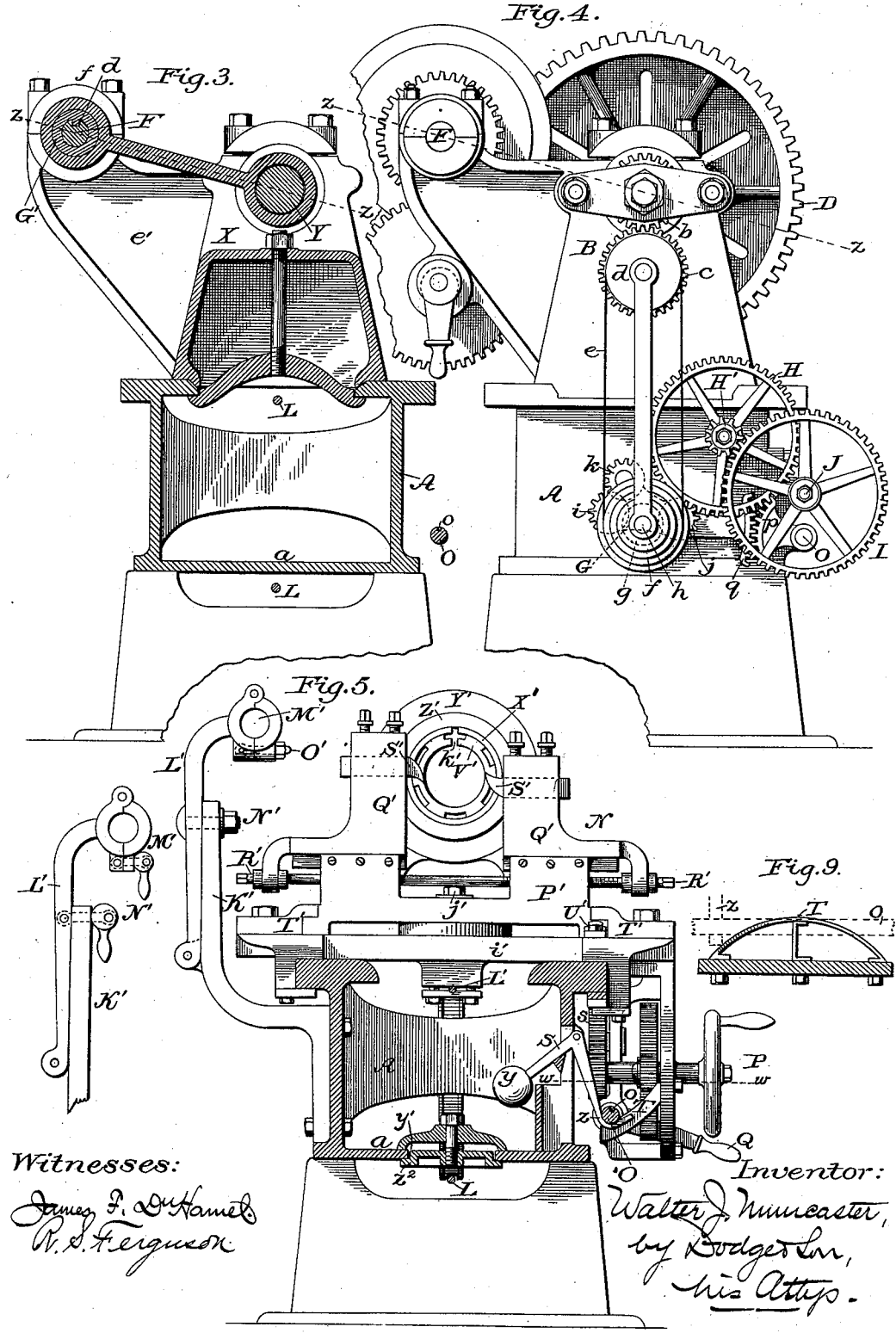

(No Model.)  4 Sheets—Sheet 4.

W. J. MUNCASTER.
LATHE FOR TURNING SHAFTING.

No. 334,538.  Patented Jan. 19, 1886.

Witnesses:
James F. DuHamel
R. S. Ferguson

Inventor:
Walter J. Muncaster,
by Dodgerson,
his Attys.

UNITED STATES PATENT OFFICE.

WALTER J. MUNCASTER, OF CUMBERLAND, MARYLAND, ASSIGNOR OF ONE-HALF TO MERWIN McKAIG, OF SAME PLACE.

LATHE FOR TURNING SHAFTING.

SPECIFICATION forming part of Letters Patent No. 334,538, dated January 19, 1886.

Application filed August 27, 1885. Serial No. 175,478. (No model.)

*To all whom it may concern:*

Be it known that I, WALTER J. MUNCASTER, of Cumberland, in the county of Alleghany and State of Maryland, have invented certain new and useful Improvements in Lathes for Turning Shafting, &c., of which the following is a specification.

My invention relates to lathes and machinery for turning shafting; and it consists in a number of details and improvements having for their primary object the more rapid and convenient use of the machine. These various improvements will be fully pointed out and explained in connection with the accompanying drawings, in which—

Figure 1:
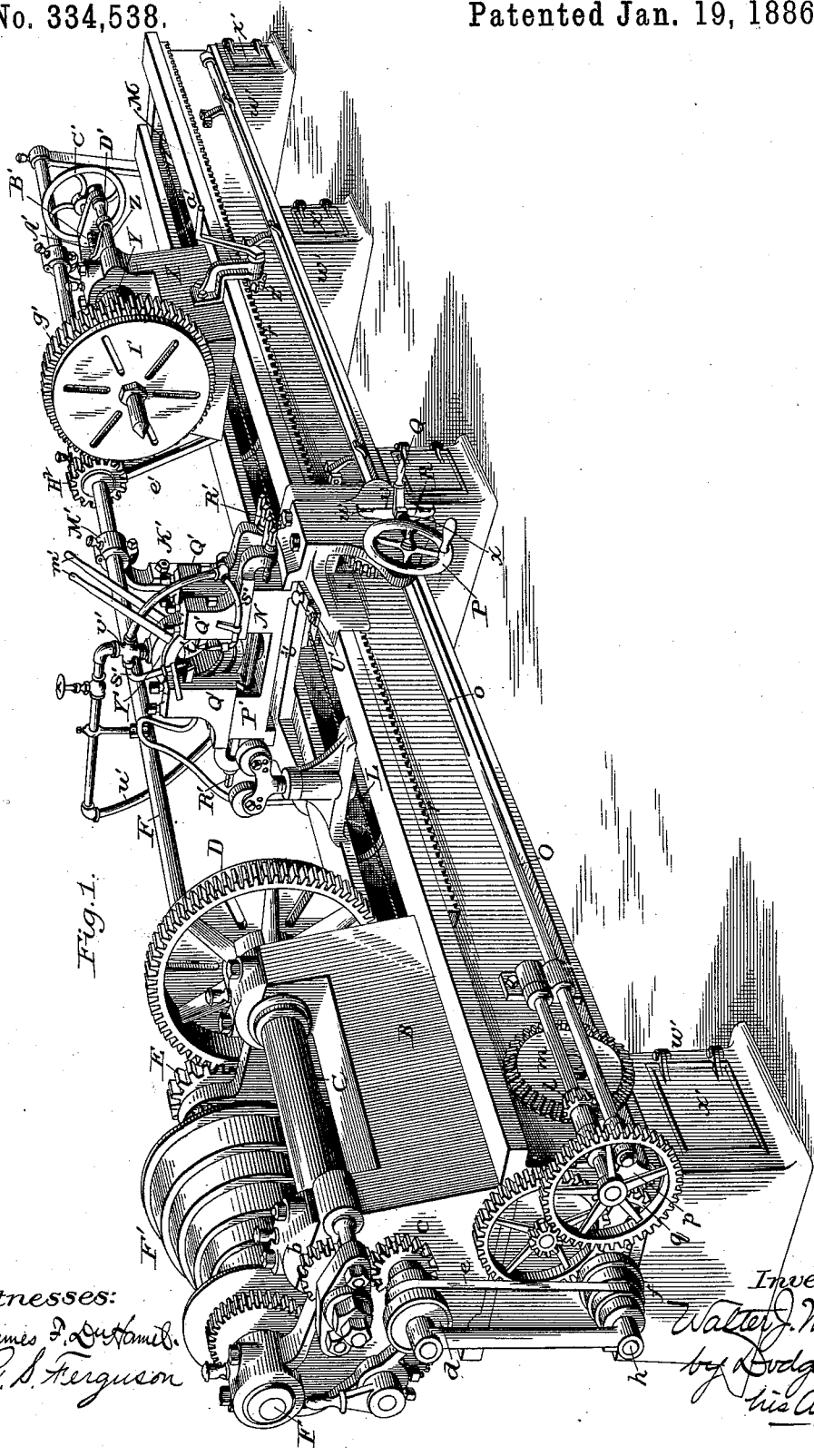
Figure 6:
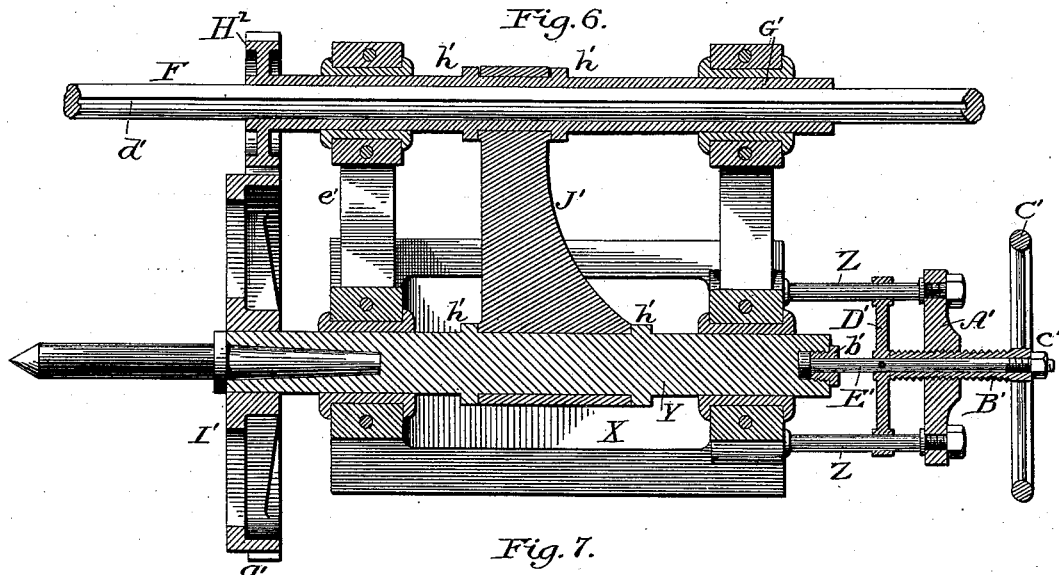
Figure 7:
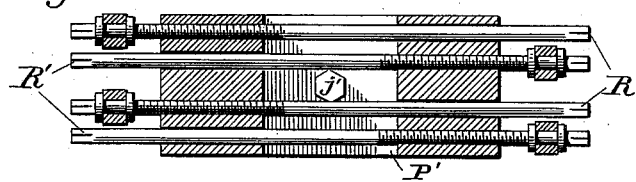
Figure 8:
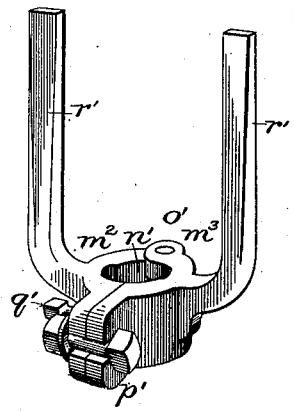

Figure 1 is a perspective view of the lathe and its mountings complete; Fig. 2, a longitudinal vertical section; Fig. 3, a vertical transverse section on the line $x\,x$ of Fig. 2; Fig. 4, an end view showing the reversing-gear; Fig. 5, a vertical cross-section on the line $y\,y$ of Fig. 2; Fig. 6, a section in the plane of line $z\,z$ of Figs. 3 and 4, taken through the tail-stock and the back shaft; Fig. 7, a sectional view illustrating the arrangement of screws for adjusting the cutting-tools; Fig. 8, an enlarged perspective view of the dog, and Fig. 9 a section on the line $w\,w$ of Fig. 5.

In order that the objects and advantages of the present invention may be the better understood, I shall state some of the difficulties met with in existing machinery of this class, and then explain the manner in which the same are avoided. Ordinarily, the shaft to be turned is mounted upon the centers of the head and tail stocks, and the end nearest the head-stock is connected and caused to rotate with the face-plate thereof by a lathe-dog. Under such arrangement the tail-stock center, being stationary, is ground and worn away by the rotation of the shaft thereon, and the shaft being driven from one end only is apt to spring or twist, unless very heavy, thus greatly interfering with the speed and accuracy of the work. Heretofore it has been necessary also to dismount the shaft when the cutting-tools neared the dog, reverse the shaft end for end, carry the tools back, and finish the portion previously held by the dog. To obviate these difficulties, I provide a face-plate for the tail-stock, as well as for the head-stock, and employ a dog at each end of the shaft, and provide means for driving both face-plates alike, so that the shaft is turned with equal power at both ends, and that when the tools approach the dog at either end said dog can be removed and the tools run clear to the end of the shaft, while the latter is driven from the opposite end. To further provide for this full travel of the tools, I employ a separable dog having two tails of more than ordinary length, the extra length being necessitated by a similar extension of the lathe-centers to give room for the tools between the face-plates and the ends of the shafts. Under this plan it is not necessary to reverse the shaft end for end to finish it, and it is therefore unnecessary to run the tool stock or carriage back for that purpose. Under existing plans, however, the tool stock or carriage must be run back with each new shaft, because the tools can work only one way. To avoid this necessity, I so construct and arrange the tool-stock that it may be swung horizontally about a central pivot on the carriage, and the tools thus made to work back to the starting-point, the lathe being of course reversed with each reversal of the tool-stock.

In carrying out these improvements many details of course have to be considered, and these I have carefully provided for, as will be explained in the following description:

A indicates the main frame of the machine, which will be of suitable dimensions and of essentially the same design as other machines of this class, except that a closed bottom, $a$, is provided to form with the sides a trough for the purpose of collecting the water used upon and falling from the cutting-tools. Suitable outlets, one or more, are provided to permit the water to run off.

B indicates the head-stock, the arbor C of which carries at its forward end the face-plate D, keyed or otherwise rigidly secured thereon.

As shown in Figs. 1, 2, and 4, the periphery of the face-plate D is provided with gear-teeth to mesh with the corresponding teeth of gear-wheel E on the driving shaft or spindle F of the lathe, suitable gear and back gear being provided for driving said shaft, as indicated, and as is customary in this class of machinery.

From the arbor C motion is transmitted, through gear-wheels b c, to a cone-pulley, d, which is connected by a belt, e, with a second cone-pulley, f, upon which is formed or to which is secured a pinion, g.

Secured upon the loose axle or shaft h of cone-pulley f is a rocking plate, G, carrying three pinions, i j k, the pinions i and j meshing directly with pinion g of the cone-pulley, and pinion k being driven from pinion g through the medium of pinion i.

H indicates an idler-gear, receiving motion from pinion j or pinion k, and provided with a pinion, H', which meshes with and gives motion to a gear-wheel, I, keyed fast upon a shaft, J, carried in suitable bearings at the front of frame A, and bearing a bevel-pinion, l. The pinion l gives motion to a bevel gear-wheel, m, upon the shaft n of a drum, K, located within the frame A, upon which is wound a wire rope or cable, L. The rope or cable passes from the drum at or near one end of frame A to and around a sheave or pulley, M, at the opposite end of the frame, and back to the drum, both its ends being made fast to the drum, and a sufficient length being wound thereon to permit the tool-carriage N, which is clamped to the rope, to be traversed from end to end of the frame, or as nearly so as required. From this explanation it will be seen that if the plate G be set to throw the pinion J into mesh with gear H, the drum K will be rotated in one direction; but if said plate be set to throw pinion k into mesh with said wheel, the drum will be rotated in the reverse direction, and as the drum turns in one or the other direction the tool-carriage will be caused to move forward or backward.

To control the plate G and the reversing-gear, I provide a shaft, O, which extends along the front of frame A nearly its entire length, and which has a key seat or groove, o, cut in it from end to end, or nearly so. This shaft O carries at one end a toothed sector, p, which meshes with a similar toothed sector, q, secured upon the shaft or axle h, which carries plate G. When, therefore, the shaft O is rocked or tipped, it causes the plate G to be rocked through the intermediate sectors and shaft, and in this way the pinion k or the pinion j may either one be brought into gear with wheel H and caused to give motion to the drum K in whichever direction required. If it be desired to throw the drum out of gear entirely, the plate G is set at an intermediate position, which throws pinions j and k both clear of the wheel h. In this way the drum may be caused to rotate and to move the carriage in either direction at will, or it may be made to remain at rest, leaving the tool-carriage N at rest, or free to be moved manually, as presently explained. When the pinions i and j are both out of gear with wheel H, the carriage N may of course be moved along the ways of frame A, in either direction desired, without affecting any of the driving-gear beyond wheel H, the intermediate gearing partaking motion of course with the carriage.

To facilitate the manual traversing of the carriage N, I provide the frame A with a toothed rack, r, and the carriage with an overhanging plate or bracket, in or behind which is arranged suitable gearing for transmitting rotary motion from a hand-wheel, P, on the outside of said bracket to a pinion, s, at the inside of the bracket, meshing with the rack r. When the hand-wheel is turned, the tool-carriage is caused to travel slowly and evenly, but with adequate power, as in other machines of this class. It is necessary that the carriage shall have an unobstructed passage along the frame A, and it is therefore impracticable to rigidly secure an operating-lever upon the reversing-shaft O at any point within the travel of the carriage. It is moreover important that the lever by which said shaft is controlled be within easy reach of the attendant while in position to observe the tools closely and to judge of their action. For these reasons I employ a lever, Q, the hub or boss of which encircles the shaft O, and has a spline or feather fitting the groove o of said shaft, thus permitting the lever to slide lengthwise of the shaft without allowing it to turn thereon. The lever Q is carried out through a slot or opening, v, in the depending bracket or plate of the carriage N, and consequently partakes of the motion of the carriage back and forth along frame A. In this way the lever is kept always with the carriage, and consequently close to the cutting-tools.

As stated, plate G, which carries the reversing-pinions, can be set in three different positions and caused to drive the feed mechanism forward or backward or to disconnect itself entirely therefrom. Such adjustment is effected by the lever Q, which of course occupies three different positions accordingly.

To retain the lever in its adjusted position, I provide at one side of the slot or opening v a sliding plate, R, having three notches, w, in its edge next to the opening v, and urged toward said opening by a spring, x. The notches w or the upper and lower edges of the lever Q are beveled or rounded, so that while holding the lever with sufficient force to prevent its accidental displacement the plate may be readily pressed back by applying a slightly-greater force to move the lever from one notch to another.

It is impracticable, or at least inconvenient, to employ stationary brackets or supports for reversing the shaft O at points between its ends, for the reason that they are liable to be in the way of traveling carriage N, its gearing or mountings, and yet the shaft is of such length that unless made unduly heavy it will require intermediate support to prevent it from sagging and binding in its bearings. I therefore provide a series of yielding supports, adapted to be forced back one at a time by the advancing carriage out of its way. One of these supports is shown in Fig. 5, and consists of an elbow-lever, S, the arms of which extend downward below its pivot, and one arm of which extends inward into the interior of frame A, where it is furnished with a counter-weight, $y$, while the other arm extends outward, and is bent up in the form of a stirrup, $z$, to fit beneath and support the shaft O.

T indicates a guard carried by the carriage N, and inclined outward toward each end of the carriage, as shown in Figs. 5 and 9. As the carriage travels along the frame in either direction, one or the other inclined face of the guard bears against and presses back the yielding supports S, one after another, holding the same back until the gearing passes and there is no further necessity for longer holding out of supporting position. As the supports are only thrown back one at a time, there are always a sufficient number in position to prevent the sagging of the shaft. The sheave or pulley M is carried by a yoke, U, the stem of which passes through a tubular boss, $u$, is encircled by a spiral spring, V, outside of frame A, and carries at its outer end a washer and a nut, W, by which the tension of the spring may be increased as required, and the rope or cable L kept constantly taut.

X indicates the tail-stock, which is arranged to slide along the ways of frame A and to be clamped at any desired point thereon, as usual. To facilitate its travel, I provide it with a pinion, $z'$, meshing with rack $r$, and furnished with a winch or handle, $a'$, by which it may be rotated and caused to move the carriage. The spindle or arbor Y of the tail-stock is made cylindrical and arranged to slide through its bearings in the stock proper, and to move it back and forth as required I provide the mechanism shown in Figs. 2 and 6. By reference to said figures it will be seen that two posts or rods, Z, are screwed horizontally into the rear end or face of the stock X, with their axes in a line with the axis of spindle Y, and upon their outer ends is secured a cross head or bar, A'. The cross head or bar A' is provided with a hole concentric with the axis of spindle Y, and threaded to receive a tubular screw stem or sleeve, B', the outer end of which carries a hand-wheel, C', and the inner end of which bears against a cross-head, D', the ends of which are bored and fitted accurately upon the rods Z, which form guides for it in its movements.

Through the tubular screws B' and cross-head D' passes a smooth cylindrical stem or spindle, E', the inner end of which is enlarged and swiveled in the rear end of the spindle Y, where it may be retained by a tubular plug, $b'$, and the outer end of which projects beyond the screw B' and hand-wheel C' and carries a nut, $c'$. The stem or spindle E' is connected with cross-head D' in any convenient manner adapted to prevent the travel of either independently of the other in the direction of the length of the spindle. This may be by a collar in front of the cross-bar or by a pin passing through the bar and spindle. Under this construction and arrangement rotation of hand-wheel C', bearing either against cross-head D' or nut $c'$, causes the spindle E' to move forward or backward and to carry with it the spindle or arbor Y. There being no rotation of spindle E', there is of course no tendency of the screw B' to run back, and thus to allow the arbor or spindle Y to recede, as happens with other lathes or like machinery; and this result I accomplish without clamping the screw in any way, as is necessarily done in other machines.

As before stated, the face-plate of the tail-stock is driven positively and directly the same as that of the head-stock. The means by which this is effected is illustrated in Figs. 1, 2, 3, and 6.

As best shown in Figs. 1 and 2, the shaft or spindle F, which passes through cone-pulley F', and which receives motion either directly from said cone-pulley or intermediately through the back gear, extends from end to end of frame A, at each end of which it is carried in suitable bearings or supports. The shaft F is provided with a groove or key-seat, $d'$, extending throughout its length or to its journals.

Encircling the shaft F, and supported by arms or brackets $e'$, is a sleeve, G', having a spline or feather, $f'$, adapted to fit closely yet slide freely within the groove $d'$. Upon the end of this sleeve G' there is keyed or secured a pinion or gear-wheel, H², which meshes with the toothed periphery $g'$ of face-plate I', and thus transmits motion to said face-plate from the shaft F as the latter is rotated.

For the purpose of keeping the pinion H² always in mesh with and in proper relation to the face-plate I', the spindle or arbor Y and the sleeve G' are both formed or supplied with collars $h'$, and a connecting arm or bar, J', extends from the arbor to the sleeve, encircling both and closely filling the space between the two collars of each.

The encircling portions of the connecting-bar may be made separable, or the collars $h'$ may be made removable to permit the application or removal of said bar. The arbor or spindle Y and the sleeve G' are both free to rotate in the arm or bar J'; but they and their respective gears are kept constantly in a fixed relation during all adjustments of the tail-stock or of the spindle Y; and as the sleeve is free to move along the shaft F, but is compelled to rotate therewith, it follows that the face-plate I' will be driven positively in all positions of the tail-stock and its spindle Y. Owing to the length of the shaft F it is necessary to support it at points between its ends, and it is also essential that the supports be capable of being thrown back out of the way of the tail-stock and its attachments to permit the full and free travel of the latter. To this end the frame A has secured to its rear side brackets or uprights K', which terminate at a point outside of and below the level of the arms or supports e', in which the sleeve G' is carried. To each of these brackets or uprights K' is hinged an upright arm, L', the hinge or joint being some distance below the top of the bracket, as shown in Fig. 5, each arm L' having at its upper end a separable box, M', with an opening concentric with and of a size to receive and support the shaft F. Each arm L' is held firmly in position and closely in contact with the rear face of its supporting-bracket K' by a bolt, N', passing through the two, which bolt of course, instead of being threaded and furnished with a nut, as here shown, may be a slotted bolt and furnished with an eccentric or cam, by which it may be quickly drawn up or released. The separable box M' also has one section hinged to the other at one side of the center and a threaded bolt and nut at the other side of the center, for holding the parts against separation or opening. Here, too, the threaded bolt O' may be replaced by a hinged bolt carrying a cam or eccentric adapted to swing behind lugs on the fixed member of the box and to draw the parts together. Such construction permits a more ready loosening or drawing up of the bolts mentioned, and may for that reason be preferred. The supports for shaft F being thus constructed, it is only necessary in order to permit the tail-stock and its driving-gear to pass a given support to first loosen bolt O' and open box M', then release bolt N' and throw the arm L' outward out of the path of the tail-stock, sleeve G', and connected parts. When the latter are moved to the required point, if clear of the support thus thrown out of position, said support is brought back to place and secured, whereupon the machine is again ready for operation; or, if the position of the tail-stock interferes with the return of the support to its place, said support will not be required and the machine will be operated without it.

It remains to describe the construction of the tool-stock and the dog by which the working of the tools throughout the travel of the carriage in both directions is secured. As already explained, the carriage N is moved back and forth by the winding of the wire rope or cable L on and off the drum, the bed plate or base i' of said carriage being clamped to the cable, as shown in Figs. 2 and 5. The slide or base is held down upon the ways of the frame A, as indicated, and is formed with a circular central boss, upon which a block, P', rests, and is arranged to rotate or turn in a horizontal plane for the purpose of reversing the position of the tools from front to rear and from rear to front of the machine, a central bolt or pivot, j', serving to center the block P' and to retain it always in proper position. The block P' carries four sliding tool-posts, Q', each controlled by an independent feed-screw, R'. These tool-posts are arranged at opposite sides of the vertical plane of the lathe-centers, and are furnished one with an upwardly and the other with a downwardly turned cutting-tool, S', so that the shaft may be dressed or turned on both the front and rear sides at one time, and thus not only brought to form and size more quickly than could otherwise be done, but also prevented from springing or chattering. The ends of block P' are curved on arcs of a circle of which pivot-bolt j' is the center, and said ends swing under and are closely held by flanged guides or retaining-blocks T', bolted fast upon the slide or base-plate i' of the tool-carriage N. At the forward side of the tool-carriage are two latches or locking-pieces, U', which, when dropped to place flat upon the slide or base i', bear against opposite faces of the rotatable block P', and hold it firmly in the exact position required to properly present the tools to the work, with the block turned either end forward. When it becomes necessary to reverse the block and tools, the latches U' are simply raised and turned back, and the block can then be swung around end for end, the latches again dropped to their locking position, and the machine made ready for use. It will be seen that the reversal of the block P' reverses the position of the feed-screws, and that if made to operate only from one end, as is customary, they could not all be operated from the front, as of course they must be in practice. To permit such operation of all the screws from one side of the machine, all the feed-screws R' are carried through from one end of the block P' to the other, and squared at both ends to receive a wrench or key by which to turn them. This construction will be readily understood upon referring to Figs. 1, 5, and 7. The forward pair of tool-posts are intended to carry roughening or cutting tools, and the rear pair to carry finishing or dressing tools. Between the forward and rear tool-posts there is mounted a bushing or hollow cylindrical support, V', through which the shaft passes and by which it is supported close to the cutting-tools. In some cases I attach to one of the tool-posts a burring or finishing tool or gage, W', consisting of an internally-toothed ring or hollow cylinder, such as are now used for a like purpose. The bushing V', in order to be of efficient service, must fit the shaft closely, yet not so closely as to prevent it from turning freely, and to secure such accurate fit with the variations incident to shafting in the rough it is necessary to provide for a limited amount of adjustment of the bushing. This I secure by the construction shown in Figs. 1, 2, and 5.

The bushing proper consists of the ring or hollow cylinder V, grooved parallel with its axis on the exterior, in order to make it sufficiently thin to spring, and having a narrow section cut out from end to end, leaving a space or opening, k', which permits the bushing to be contracted or compressed to reduce its diameter. The bushing V' is placed within a longitudinally-split sleeve, X', made tapering on its exterior and seated in a correspondingly-tapered opening formed in an upright annular hollow support, Y', formed upon the block P'. The forward end of the bushing V' is flanged or shouldered, to prevent its being crowded back, and both ends of the sleeve X' project beyond the faces of the support Y', and are threaded to receive heavy nuts or threaded rings Z'. The nut for the forward or smaller end is first applied, and is turned up until the tapering sleeve is so far drawn into its socket or seat as to sufficiently compress or contract the bushing, and then the other nut is applied to the rear end and screwed up, to prevent the sleeve or bushing from shifting. The nuts or rings Z' are formed with holes or sockets $l'$ to receive levers $m'$, by which to turn them. The bushing and its encircling sleeve are held against turning in their supports by means of a stud or pin or equivalent device. When the tools begin to operate at the end of the shaft next the tail-stock, or when they approach close to the head-stock, it is necessary that the lathe-dog be not in position, as otherwise the tools could not work to the end of the shaft, an operation rendered possible by the positive driving of both face-plates. I therefore construct the dogs, (of which there is one used at each end of the shaft to connect both ends with the face-plates,) as shown in Fig. 8—that is to say, in two parts, $m^2$ and $m^3$, connected at one side of the opening $n'$ by a hinge-joint, $o'$, and provided at the opposite side of said opening with a bolt, $p'$, by which the two parts may be drawn firmly together and made to clasp and bind the end of the shaft, or released and allowed to separate for removal from said shaft. A set-screw, $q'$, is also provided to further insure proper attachment to the shaft. It is advisable with this construction to provide both members or sections $m^2$ and $m^3$ with a tail, $r'$, to enter the slots of the face-plate, in order that the fastenings of the dog may not be subjected to undue strain.

For the purpose of keeping the tools and shafting cool, I mount upon the tool-carriage N a system of pipes, $s'$, which deliver water, through jets or nozzles $t'$, to the cutting-tools. The main supply-pipe, which is connected with a hydrant or service-pipe by a flexible tube or hose, $u'$, is connected with and supported by the annular support, Y', through a swivel joint or connection, $v'$, concentric with pivot $j'$ of the block P', so that said block and its tools can be reversed without disturbing the water-pipes or their connections. The water which drips from the tools and shafting falls into the trough formed by the sides and bottom of frame A, and flows off through an outlet provided at any suitable point.

To permit the turnings, chips, and cuttings to be conveniently removed from the trough from time to time, the supports $w'$, on which the frame A rests, and which are made hollow or of box form, are each provided with a door, $x'$, and placed directly beneath a hole or opening, $y'$, having a removable cover, $z^2$, which, being displaced, permits the cuttings, &c., to be swept into a receptacle, passed through the door $x'$, and held beneath the opening $y'$. Such parts as are not specifically described or fully illustrated may be of ordinary construction.

It is obvious that instead of mounting pinion $H^2$ upon the sleeve G', a lantern-pinion or a pinion having flanges to project inward past the sides of the teeth of the face-plate may be used, such pinion being of course caused to move with the face-plate by reason of the flanges.

Instead of running the tool-carriage back to the tail-stock preparatory to working upon a new shaft, the tool-carriage is simply turned end for end, thus enabling it to work equally well in traveling from the head-stock toward the tail-stock. The centers are long enough to extend through and beyond the bushing, and thus allow the tools to work entirely over the end of the shaft.

It is obvious that any desired number of tool-holders may be used, from one upward, and my invention comprehends the use of only one, or any larger number, as may be found requisite for the special work to be done.

Having thus described my invention, what I claim is—

1. The combination, in a lathe, of a frame, a head-stock provided with a face-plate, a tail-stock provided with a face-plate, a shaft carrying a pinion in mesh with the face-plate of the head-stock, a sleeve mounted upon the shaft and carrying a pinion in mesh with the face-plate of the tail-stock, said sleeve adapted to slide upon the shaft, but to rotate only in unison therewith, and an arm projecting from the tail-stock and having the sleeve loosely journaled in it, whereby the sleeve and its pinion are maintained always in fixed relation to the face-plate of the tail-stock.

2. In a lathe, the combination of a frame, A, a head-stock, B, provided with a face-plate, D, a tail-stock, X, provided with a face-plate, I', a shaft, F, provided with a pinion, E, meshing with face-plate D, a sleeve, G', encircling and adapted to slide upon the shaft F, a pinion, $H^2$, carried by said sleeve and meshing with face-plate I', and an arm, J', swiveled upon the spindle Y of the tail-stock, and having the sleeve G' journaled in it, all substantially as shown and described.

3. In a lathe, the combination of a frame, A, a head-stock, B, provided with a face-plate, D, a tail-stock, X, provided with a face-plate, I', a shaft, F, provided with a pinion, E, meshing with face-plate D, a sleeve, G', encircling and adapted to slide upon the shaft F, a pinion, $H^2$, carried by said sleeve and meshing with face-plate I', an arm, J', swiveled upon the spindle Y of the tail-stock, and having the sleeve G' journaled in it, and a screw connected with and serving to move said spindle longitudinally, substantially as set forth.

4. In combination with the arbor Y of tail-stock X, stem or spindle E', swiveled in the rear end of said arbor, threaded sleeve or screw B', encircling said stem or spindle and bearing at its ends against cross-bar D' and nut c', and cross-bar A', carried by the tail-stock and threaded to receive the screw B', whereby the rotation of the screw is caused to advance or recede the arbor, but the rotation of the arbor is prevented from turning the screw.

5. In combination with a turning-lathe, a reversible tool carriage or holder provided on both sides with devices for adjusting the tools, whereby it is adapted to be used either end forward.

6. In a lathe for turning shafting, &c., the combination of a frame provided with a head-stock and tail-stock, a carriage adapted to traverse the frame between said stocks, and a tool-holder mounted upon said carriage, and adapted to be swung or moved from one side of the vertical plane of the lathe-centers to the other.

7. The combination, in a lathe, of a head-stock, a tail-stock, gearing adapted to drive the arbors of both stocks directly and positively, and a tool-carriage having tool-holders adapted and arranged to be set at either the front or rear side of the vertical plane of the lathe-centers at will.

8. In a lathe, the combination of a reversible tool-carriage provided with tool-posts on opposite sides of the center, and feed-screws for said tool-posts extending from one side of the carriage to the other and adapted to be turned from either end at will.

9. The dog, for use in connection with a lathe such as described, consisting of the parts $m'$ $m^2$, hinged together and provided with fastening $p'$.

10. The dog consisting of parts $m'$ $m^2$, each provided with an extension or tail to engage with a face-plate, said parts being connected by a hinge, $o'$, and provided with a fastening device, $p'$, substantially as described and shown.

11. In a lathe, the combination of a driving-shaft, F, a head-stock and tail stock, and gearing connecting the shaft and the arbors of said stocks, and supports for said shaft at points between the head and tail stocks, adapted to be thrown back to allow the tail-stock and its gearing to pass.

12. In a lathe, the combination, with tail-stock X, shaft F, and intermediate connections, of shaft-supports consisting of hinged arms L', provided with separable boxes M', and fastening devices for closing the boxes about the shafts and for holding the supports in an upright or working position.

13. In a lathe, the combination of a frame, a head-stock, a tail-stock, a traveling tool-carriage, a drum mounted within the frame near one end, a sheave or pulley mounted within the frame near the opposite end, and a rope or cable clamped to the tool-carriage, having both its ends made fast to the drum and wound upon the drum in sufficient length to permit the full travel of the tool-carriage as the cable is wound off the drum in one direction and upon it in the other.

14. The combination, with the traveling tool-carriage, of a lathe, a drum, K, at one end of the lathe, a sheave, M, at the opposite end, having a stem encircled and drawn back by a spring, as V, and a cable, L, made fast to the tool-carriage and to the drum, and passing about the drum and sheave, as shown and described.

15. In combination with the traveling tool-carriage of a lathe, a drum at one end of the lathe, a cable passing about the drum and attached to the tool-carriage, and a sheave or pulley at the opposite end of the frames, about which the cable passes, and a tension device applied to said sheave to keep the cable taut.

16. In combination with a lathe and its feed gear, the reversing mechanism consisting of gear H, rock-shaft $h$, rocking plate G, and segment $j$, secured upon said rock-shaft, pulley $f$ and pinion $g$, mounted loosely upon the rock-shaft $h$, pinions $i$ $j$ $k$, carried by plate G, shaft O, and segment $p$, carried by said shaft and meshing with segment $q$.

17. In a lathe, the combination, with a reversing rock-shaft, O, of a controlling-lever, Q, mounted upon said shaft and adapted to slide lengthwise of said shaft, but held against movement about the axis of the shaft except in unison with the shaft.

18. In a lathe, the combination, with reversing-shaft O and tool-carriage N, of hand-lever Q, extending through an opening in the carriage and adapted to rock the shaft, but free to slide thereon in the direction of the length of the carriage.

19. In combination with shaft O, a counterbalanced support, S, and a traveling tool-carriage provided with a guard, T, adapted to press back said support to permit the passage of the carriage.

20. In a lathe, and in combination with a traveling tool-carriage having an annular support, Y', with a tapering opening, a split bushing, V', and a tapering split sleeve passing through said opening and provided at its ends with nuts X'.

21. In combination with frame A, having bottom $a$, provided with openings $y'$ and covers $z^2$, supports $w'$ for said frame, provided with doors $x'$.

22. In a lathe, the combination, with reversing-shaft O and its operating-lever Q, of locking-plate R, provided with notches $w$, and spring $x$, pressing against said plate, substantially as shown.

WALTER J. MUNCASTER.

Witnesses:
C. SMITH, Jr.,
F. M. OFFUTT.